REMOTE CONCENTRATOR LINE CIRCUIT

Filed May 22, 1961

INVENTORS G. F. ABBOTT, JR.
W. WHITNEY
BY S E Hollander
ATTORNEY 3,159,714

REMOTE CONCENTRATOR LINE CIRCUIT

George F. Abbott, Jr., Berkeley Heights, N.J., and Wiley Whitney, Columbus, Ohio, assignors to Bell Telephone Laboratories, Incorporated, New York, N.Y., a corporation of New York Filed May 22, 1961, Ser. No. 111,569
17 Claims. (Cl. 179—18)

This invention relates to telephone line concentrating systems and more particularly to combined line and cut-off circuits for use at remote concentrators. Each combined line and cut-off circuit thus employed is associated with a remotely terminated substation in the line concentrator system.

Telephone line concentration has become the subject of considerable interest in telephone switching technology. In part this is attributable to the savings in copper and other outside plant costs which result from the lack of necessity to directly connect each substation line to the telephone office. Instead the lines are terminated at a remote unit situated proximate to the center of density of the area of subscribers to be served from which "concentrator" unit or switching unit extend a number of trunks less in number than the number of lines. These trunks are connected to the telephone office and are used on a "shared" basis by the substation lines terminated at the concentrator.

A particularly advantageous type of line concentrator is the so-called universal type. The title is intended to indicate the universality of its application, i.e., it may be employed in conjunction with any conventional type telephone switching system. A singularly desirable aspect of the universal concentrator is that the telephone central office existing or conventional equipment need not be substantially modified to render it compatible with concentrator operation.

Traditional central office terminated lines in telephone switching systems include a line relay or sensory device and a cut-off relay for divorcing the line relay from the line during a conversation connection or the equivalent in other structures of the relays. The function of the line relay is in the nature of a rudimentary scanner. When a substation goes off-hook, for example, the line relay connected to the energized line is operated to indicate this condition and to trigger the appropriate responsive apparatus in the central office to initiate a connection to the calling substation line. Since the sensory device or line relay is generally connected in shunt or in bridge with the substation line it is obviously desirable, when a connection has been extended to the line for conversation purposes, to eliminate the shunting effect of the line relay and thereby forestall the possible deleterious effects on transmission occasioned by the bridging impedance.

In conventional switching systems the latter function is performed by a cut-off relay which serves to isolate the winding of the line relay from the line during the conversation connection.

In a universal line concentrator, and indeed, in any concentrator, the conventional line relay or sensory device at the central office is no longer in direct metallic connection with the remotely terminated substation line. As a result, facilities must be included at the remote location adapted to perform an analogous function. The requirements at the remote location are considerably more stringent however since physical size of the sensory and cut-off device is now a significant consideration in view of the necessity to enclose, weatherproof and pole mount the concentrator unit.

It is therefore an object of this invention to provide remote line and cut-off facilities in a telephone line concentrator requiring minimal space needs.

Still another object of this invention is to provide remote sensory and cut-off equipment for a line concentrator unit in which the functions performed by the traditional line and cut-off relays are coalesced in a single composite unit.

An additional consideration with respect to remote telephone line concentrators and a very material one is the fact that they are literally remote from the central office. As a result power requirements for operation of the remote unit present challenging problems. In contrast to the supply of energy to units at the central office from traditional power supply sources the transmission of energy to the remote unit may require the spanning of several circuit miles. Under certain conditions the necessity to transmit power to the remote unit may preempt the usage of trunk connections between the remote unit and the central office. Since this type of transmission was not required in direct line systems, i.e., nonconcentrated systems, the necessity for providing conductors for power transmission is to that extent defeative of the very purpose of line concentration which is to reduce the number of conductors between the telephone subscribers and the central office.

It is therefore an object of this invention to provide remote line and cut-off facilities for a line concentrator system in which the use of continuous energy to operate the devices is not required.

Still another object of this invention is to provide sensory equipment at a remote concentrator location which may be energized by a minimal expenditure of power and remain in the energized condition with no further expenditure of power.

In certain universal concentrator systems the desirable feature of "delayed disconnect" is provided. A recent example of progressive efforts in this regard may be found in the concentrator system demonstrated in a patent of G. F. Abbott, Jr., 2,692,555 of November 29, 1960. In the delayed disconnect arrangement, when a subscriber has completed his conversation the connection of the substation through the concentrator is nevertheless maintained. This procedure is desirable since it precludes the necessity of transmitting signaling information to the concentrator appropriate to open the crosspoint at the remote switching unit until the particular trunk to which the inacive substation is connected (which trunk has been marked as idle at the central office) is required to service a new call. At this time the idle trunk is disconnected from the inactive line to which it was previously connected.

This system, although presenting obvious advantages in reducing the signaling burden, in turn generates a number of problems which stem from the fact that there is no permanent direct connection between each of the substation lines and the central office. Thus an anomaly which results from concentrator delay disconnect practice in universal line concentrators is that the primary line circuit, i.e., the conventional line and cut-off relay at the central office and the secondary line circuit, i.e., the improved remote line and cut-off facilities discussed above, may at times (and specifically during a delayed trunk disconnect) reflect different states. Under these circumstances the primary line circuit would indicate accurately that the line connected to the trunk is idle and available for terminating or originating calls. The secondary line circuit or remote line circuit on the other hand, since the trunk remains connected to the substation, will be completely divorced from the substation line by the cut-off facilities in the same manner as though the substation were occupied with a conversation connection.

Reflection on these circumstances is convincing of the necessity for this procedure. In short, if a substation line in the idle condition but nevertheless connected to a trunk to the central office as a result of the delayed trunk disconnect procedure goes off-hook, the sensory equipment in the remote unit will completely overlook this supervisory indication since it is physically isolated by the cut-off unit from the line. Since the primary line circuit at the central office is connected to the line, however, as indicated above, it will immediately react to the off-hook condition to actuate the appropriate common control apparatus in the central office to extend the call. Under these conditions the concentrated line is processed effectually in the same manner as though it were a direct connected line. This is understandable since as a result of the delayed disconnect the substation line in effect enjoys a direct connection over the idle trunk to the central office.

It is thus apparent that either the sensory unit at the remote location or the sensory unit at the central office location must have electrical access to the line to sense its supervisory condition. Recognizing these factors, the threat implicit in the use of remote line and cut-off equipment becomes evident. In short, if the line is divorced from the line relay or conventional sensory equipment at the central office and if the line is also divorced from the remote sensory equipment or line relay at the remote unit the customer is completely denied any electrical access to the office. This follows since his line has become wholly isolated and in effect he will be granted a "dead" line if his substation receiver is taken off-hook. Moreover, he will have no way of communicating this fact to the central office.

It is therefore an object of this invention to provide remote line and cut-off facilities having a high degree of accuracy and reliability.

Still another object of this invention is to provide remote line and cut-off facilities which may be controlled with simplicity from a remote location to reflect the same or different operating states relative to that of the line and cut-off facilities at the central office in accordance with the dictates of delay disconnect practice.

These and other objects and features of the invention are achieved in an illustrative embodiment in which the secondary line circuit comprises three reed switches or pairs of contacts of a type similar to that described in Patent 2,289,830 of W. B. Ellwood of July 14, 1942. Two of the contact sets are connected in bridge with the substation line and serve as the traditional cut-off contacts. The third contact set or switch is normally open and reflects the supervisory condition of the substation to effect an alerting of central office equipment by providing a detectable condition to a line scanner at the remote concentrator. Physically the three switches are disposed in parallel axial relationship. A permanent magnet is located in appropriate relation with respect to two of the switches in order that these switches be magnetically latching in the closed condition and that they remain indefinitely in the closed condition once operated thereto without further additional power drain. The third switch for providing the detectable condition reflecting the supervisory state of the substation is not magnetically latching. The three switches are encompassed by two separate windings. A first of these windings is connected to a concentrator network control and may be energized in one direction or the other to operate or release the first and second pairs of contacts in accordance with the state of the substation. The second winding is connected in series with the contacts coupled to the substation line and is energizable in only one direction to operate the third set of contacts. The three switches are physically similar to the Ellwood switch described above although the first and second switches may be latched in the closed condition against the normal pull of the reeds by a permanent magnet.

The latching contacts are the contacts which conventionally appear on the cut-off relay and the nonlatching set of contacts is the line relay contacts.

In operation, when a subscriber substation goes off-hook, current is applied over the line tip and ring to the second winding which produces a flux sufficient to close the third set of contacts and is in a direction to produce a still greater closing force for the normally closed first and second contact sets which therefore remain closed.

As a result of the closure of the third set of contacts a detectable condition is presented to a signaling network and scanner to initiate scanning of all of the lines thereby to determine the identification of the off-hook line. Ultimately, when a trunk is connected to the calling line a signal is applied from a concentrator network control to the second winding to open all the latching contacts.

When the line is disconnected from the trunk the concentrator network control transmits an oppositely polarized pulse of lesser intensity than the previous pulse to the second winding to close the latching contacts. The first and second contacts remain magnetically latched in the closed position while the third set remains in the open condition in view of a mechanical bias which prevents closure by the smaller current. Alternatively, appropriate and conventional delay devices in the scanner may be used to ignore the short duration signal provided if the third set of contacts momentarily closes.

*General Description*

These and other objects and features of the invention may be more readily comprehended from an examination of the following specification, appended claims and attached drawing, in which:

Figures 1, 2, 3:
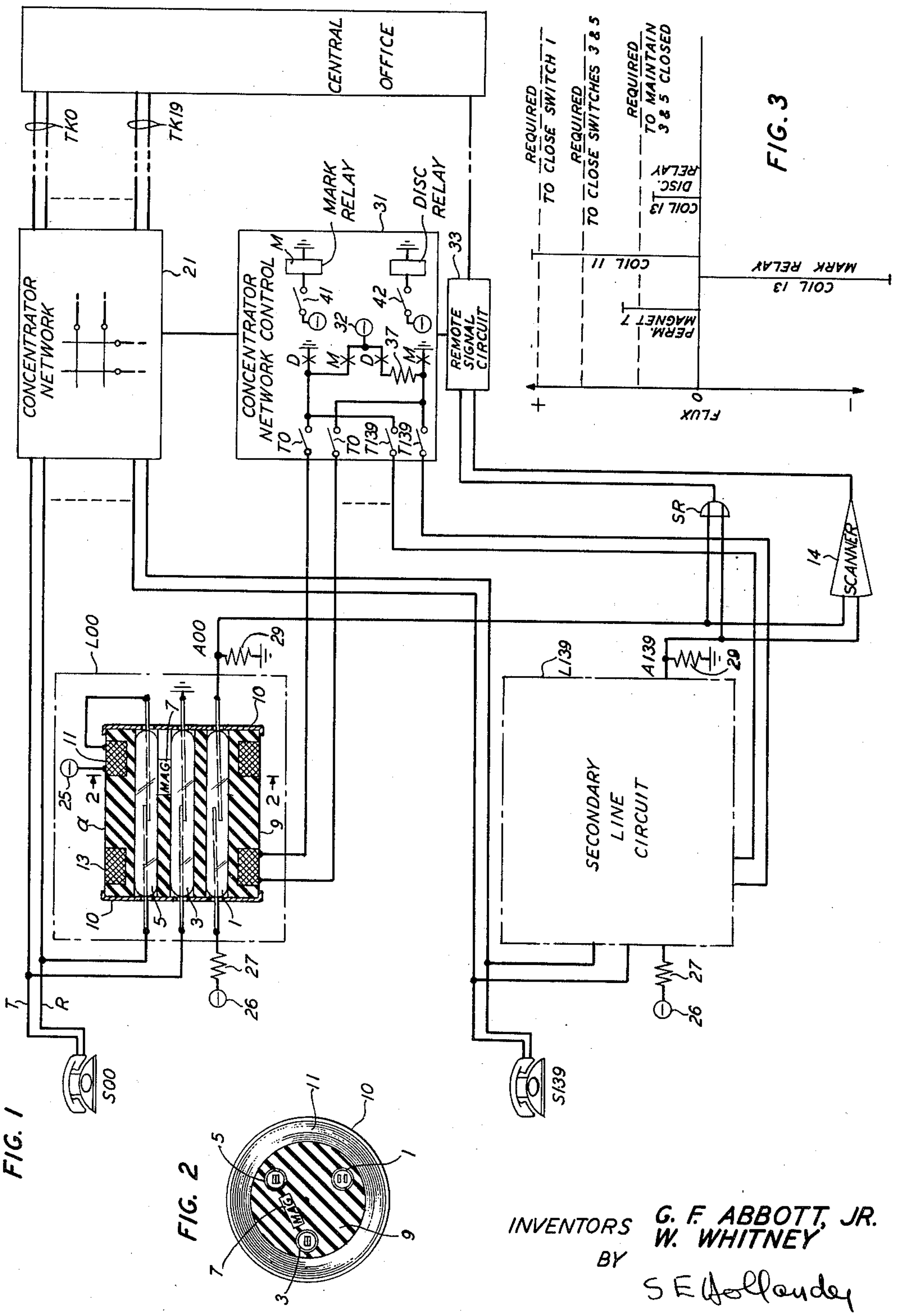
FIG. 1 shows a schematic diagram of the remote line and cut-off facilities in combination with a telephone concentrator system.
FIG. 2 shows an end elevation of the details of the switch structure of FIG. 1.
FIG. 3 shows relative flux direction for the switch structure.

Referring now to FIG. 1 the equipment includes a secondary line and cut-off circuit L00 having three sets of contacts. The cut-off contacts 3 and 5 are normally closed when the substation is not connected to a trunk. These contacts 3 and 5 are connected in bridge with the tip and ring conductors of the line respectively and in series with winding 11, which winding encompasses all three contact sets.

A further winding 13 also encompasses all three contact sets and is extended to the concentrator network control 31. Only that portion of the network control necessary for an understanding of the instant invention is shown in FIG. 1. For a comprehesive description of a network control suitable for use in conjunction with the instant invention reference may be made to an application of G. F. Abbott, Jr., Serial No. 111,571, filed on even date herewith.

The mark relay M and disconnect relay D are operated by suitable equipment in the concentrator network control as explained in the above-referred-to application. For purposes of simplicity the operation of these relays is shown herein symbolically by the operation of manual switches 41 and 42.

It is apparent that the operation of mark relay M as a result of the actuation of switch 41 drives a current through coil 13 in a first direction and the subsequent operation of disconnect relay D drives a pulse of current through the coil 13 in the opposite direction. Coil 13 is wound in a manner which permits current of the first direction to open the latching contacts and current of the second direction to close the latching relay contacts as explained further herein.

In FIG. 1, line and cut-off circuit L00 is shown in detail. Line and cut-off circuit L139 is shown in outline form only for simplicity although it is understood to be identical in all respects to line circuit L00. Moreover, although only two line circuits are shown it is understood that an appropriate number may be grouped at the remote concentrator unit. For example, 140 line and cut-off relays L00 through L139 may be utilized to service 140 substations S00 through S139.

The substations are connectable through concentrator network 21 to twenty trunks TK0 through TK19 which extend to the central office. The concentrator network is not shown in detail but may illustratively include appropriate crossbar or other switching apparatus disclosed in detail in the above-referred-to application of G. F. Abbott, Jr. Signaling circuit 33 is adapted to transmit information relative to the substation supervisory conditions to and from the telephone central office.

Scanner 14 is equipped to examine the supervisory conditions of the line circuits L00 through L139 by observing potential conditions at resistors A00 through A139. OR gate SR is adapted to transmit information from any of the line circuits of the signaling circuit 33.

*General Operation*

It will be assumed for purposes of illustration that substation S00 goes off-hook. A circuit may be traced as a result through coil 11 and over switches 3 and 5 and the tip and ring conductors of the substation line through the closed switchhook contacts of substation S00.

Current flow through coil 11 creates a flux in a direction to close all of the contacts. This flux aids the latching flux provided by magnet 7 as shown in FIG. 3. Since switches 3 and 5 are already closed they remain in that condition. Switch 1, however, now closes as a result of the energization of coil 11. Negative battery is applied through switch 1 to resistance 29 and the potential at terminal A00 experiences a negative excursion from ground potential to a more negative potential. A signal is applied, as a result, through OR gate SR to the signaling circuit 33 which transmits an appropriate signal to the central office indicating that a change in supervisory state has occurred. Equipment in the central office (not shown in detail to preserve clarity) is actuated and a signal is delivered from the central office to the signaling circuit to energize scanner 14 which ascertains the identification of the line requesting service.

When this is accomplished a signal is transmitted from the central office through the signaling circuit to actuate the concentrator network control. This is done in coordination with the extension of a selected trunk, for example TK0, through the concentrator network to substation S00. When the line is connected to the trunk a further signal is transmitted from the central office to actuate the concentrator control and specifically the mark relay M in the concentrator network control. Symbolically this is shown by the actuation of manual switch 41. As a result, contacts M in the network control are closed to deliver a burst of current through coil 13. This current is in a direction to cause the switches 3 and 5 to open. Switches 3 and 5 "latch" in the open condition since the influence of permanent magnet 7 is not sufficient to reclose them although sufficient to retain them in the closed condition. Switch 1 continues in the closed condition (now under the influence of coil 13) until the burst of current is terminated. The current burst is designed to have a fast rise time to insure that contacts 1 remain closed as the neutral flux position is passed.

Since switches 3 and 5 are now in the open position it is apparent that no further bridging impedance exists across the tip and ring conductors. The conversation connection may now continue indefinitely. When subscriber S00 completes his conversation and returns the receiver to its cradle reopening the switchhook contacts the substation may nevertheless remain connected through the concentrator network 21 to trunk TK0 under the delay disconnect procedure described supra. As a result, the line circuit L00 remains completely divorced from the tip and ring conductors T and R and supervision is performed exclusively at the central office as though the line had a direct connection to the conventional existing line and cut-off equipment at the central office in the manner alluded to above.

If it becomes necessary to utilize trunk TK0, which has remained connected to substation S00, for another substation line, it is essential to restore line circuit L00 to its former sensory connection to the tip and ring conductors of substation S00. Under these conditions if the trunk was disconnected without restoring the line circuit L00 the subscriber at substation S00 will thereafter be faced with a completely "dead" line since the tip and ring conductors are both isolated from the remote line circuit at switches 3 and 5 and from the central office line circuit by the disconnection of the trunk TK0.

As a result, a signal is transmitted from the central office through the signaling network to operate disconnect relay D which applies a burst of current through coil 13 in a direction opposite to that applied by the contacts M. This operation is shown symbolically by the actuation of manual switch 42. This current (of lesser intensity by virtue of resistance 37) is in a direction to close all of the switches 1, 3 and 5 as shown in FIG. 3. Again switches 3 and 5 remain latched in the closed condition and switch 1 remains in the open position. The pulse of current is designed to be insufficient in duration and intensity to close switch 1, i.e., switch 1 has a mechanical bias sufficient to prevent closure by a current of reduced intensity such as that applied through added resistance 37.

*Detailed Description*

Having thus explained the significant aspects of the invention in general outline a detailed description of the invention now follows.

Referring to FIG. 1 the secondary line circuit is illustrated as comprising three reed switches 1, 3 and 5. A permanent magnet 7 is supported in appropriate fixed relation with nonmagnetic support 9. The nonmagnetic structure 9 may comprise any suitable material and includes three cylindrical apertures for the insertion of switches 1, 3 and 5. A permanent magnet 7 is inserted in an additional cavity. The permanent magnet 7 is located within the envelope structure in closer contiguity to switches 3 and 5 than to switch 1 in order to provide a magnetic flux density in the region of the switches 3 and 5 sufficiently in excess of the latching flux density, i.e., the flux required to maintain those switches in the closed condition for an indefinite period. Furthermore, the envelope structure 9 is provided with a pair of peripheral or annular recesses for the coils 11 and 13. Illustratively the switches 1, 3 and 5 are disposed in parallel axial relationship within coils 11 and 13. This physical disposition of the switches within the coils is shown clearly in the end elevation of FIG. 2. It will be noted that switches 3 and 5 are latched in the closed condition and switch 1 which does not latch but must be held operated is in the open condition.

In view of the latched closed condition of switches 3 and 5 when the tip and ring conductors T and R of the substation line are not connected to any trunk through the concentrator network 21, an electrically continuous path exists between switches 3 and 5 and the tip and ring conductors. This path is interrupted only at the switchhook contacts of substation S00. Thus the line circuit L00 is responsive to supervisory conditions at the substation including a line off-hook condition to alert the central office with respect thereto. When substation S00 goes off-hook the switchhook contacts complete a path for the energization of coil 1 over a circuit which may be traced from negative battery 25, coil 11, switchhook contacts 5, ring conductor R, substation S00, tip conductor T, switch 3 to ground.

The energization of coil 11 as a result of current flow therethrough produces a flux which aids the flux existing through switches 3 and 5 as shown in FIG. 3 and moreover applies a sufficient magnetomotive force to operate the contacts of switch 1. The latter switch which serves as the line relay contacts extends a path from negative battery 26, resistance 27, switch 1, resistance 29 to ground. Resistors 27 and 29 define a voltage dividing arrangement having a junction A00 at which the closure of switch 1 createst a voltage change. Prior to the operation of switch 1 the voltage at resistor 29 is substantially ground potential. When switch 1 is operated, some negative voltage appears at that junction as determined by the ratio of resistors 27 and 29. This negative voltage appears at junction A00 as a suitable detectable condition for sampling by line scanner 14.

The resultant voltage at junction A00 is directed through the common OR gate SR as an alert signal by the remote signaling circuit 33 to suitable central office equipment, not shown herein, but described in detail in the above-referred-to application of Abbott. Appropriate equipment in the central office for processing an originating call is seized. Since coil 11 appears as a bridge across the tip and ring conductors T and R it is desirable that the secondary line circuit L00 be isolated from the substation upon the connection of the substation to a trunk conductor, for example trunk conductor TK0.

In processing the originating call of substation S00 the central office will ultimately extend a connection through concentrator network 21 between the tip and ring conductors of substation S00 and an idle trunk, for example trunk TK0. The isolation of the secondary line circuit L00 is effected by interrupting the path at switches 3 and 5. This in turn interrupts the energizing path of coil 11. The opening of the switches 3 and 5 is under control of switching network control 31 which operates mark relay M momentarily to deliver a burst of current through coil 13. The operation of mark relay M is through apparatus under control of impulses delivered from the central office over the signaling network but for purposes of simplicity is shown here as a manually operated switch 41. When switch 41 is momentarily operated, mark relay M operates its appropriate contacts and a path may be traced from negative battery 32, contacts of relay M, contacts of manual switch T0, coil 13, manual switch T0, contacts of relay M to ground. The flux produced by the current through coil 13 is in a direction to oppose that through coil 11 and the magnet 7 as shown in FIG. 3 but is insufficient to reclose the contacts 3 and 5 despite the permanent magnet flux. Since contacts 3 and 5 were closed previously they now open and remain in the open condition. Switch 1 remains operated under the influence of coil 13 until the current through that coil subsides.

Individual relays T0 through T139 associated with circuits L00 through L139 provide access to the network control 131. They are omitted for clarity and shown symbolically as manual switches. A comprehensive description of these relays is available in the above-referred-to Abbott application.

In accordance with usual practice the concentrator network 21 is governed by concentrator network control 31 upon the operation of mark relay M to effect a connection of the trunk TK0 to the substation S00 at which the service request condition was initiated.

Moreover, the operation of relay M completes a path for the energization of coil 13 in the manner described above. When switches 3 and 5 are latched in the open condition substation S00 is isolated from the line and cut-off facilities L00 and a "clean" tip and ring (free of bridging impedances) to the central office is provided.

This situation continues indefinitely until positive action is taken to reclose switches 3 and 5 thereby reconnecting the tip and ring conductors to line and cut-off circuit L00.

When the conversation connection is terminated and substation S00 goes off-hook, switches 3 and 5 nevertheless remain open and the line remains connected through the concentrator network 21 to trunk TK0 in view of the delayed disconnect feature of the instant concentrator system.

Under these circumstances substation S00 is in effect granted a direct connection to the central office over trunk TK0 and the conventional line and cut-off facilities in the central office (not shown) react to the supervisory condition at substation S00 directly. The advantage is apparent in that no additional trunk selecting operation need be performed and instead subscriber S00 is in direct communication with the appropriate common control equipment at the central office necessary to extend the call.

In the event that the trunk circuit TK0 is no longer in active use by substation S00 (substation S00 is on-hook) and the trunk is needed to serve another call, it is necessary to release the connection in concentrator network 21 between the tip and ring conductors of substation S00 and trunk conductor TK0. From what has been explained above it is also vital to reconnect the subscriber substation S00 to his remote line circuit L00 at this time. If such action is omitted the result is that the subscriber is divorced from the central office by the release of the crosspoints in concentrator network 21 and is also divorced from the line and cut-off circuit L00 at the switches 3 and 5.

Through apparatus associated with the release of the crosspoints in the concentrator network 21 shown herein symbolically as a manually operated disconnected relay D but explained in detail in the above-referred-to application of G. F. Abbott, Jr., coil 13 is energized, this time in a direction opposite to that traced previously. Thus when switch 42 is closed and disconnect relay D is operated a path may be traced from ground, contacts of relay D, manual switch T0, coil 13, manual switch T0, resistance 37, contacts of relay D to negative battery 32. The current flowing through coil 13 is in a direction tending to close all of the switches 1, 3 and 5. As indicated above, switch 1 is mechanically biased in the normally open condition and requires a predetermined flux to produce a closure operation. The momentary closure of contacts D (in view of the impedance 37) produces a flux sufficient to close switches 3 and 5 (as a result of the cumulative effect of the permanent magnet flux and that due to coil 13) which remain in the latched closed condition but insufficient to close switch 1.

As a result, relay S00 is now reconnected to its line circuit L00 and an off-hook condition thereat will result in the energization of coil 11, the closure of switch 1 and a sequence of operations identical to that described above for an originating call.

It is understood that the above embodiments are merely exemplary and that various modifications may be made without departing from the spirit and scope of the invention.

What is claimed is:

1. A telephone line concentrator system including a plurality of lines, a telephone central office, a plurality of trunks extending from said office, a remote concentrator unit for connecting said lines to said trunks under control of said central office, said unit comprising a remote line and cut-off circuit, said line circuit including combined cut-off switching means and line switching means, magnetic means for latching said cut-off means in the closed condition indefinitely, means including said cut-off switching means responsive to the initiation of a service request condition on one of said lines for operating said line switching means to indicate said service request condition on said line, and means for operating said cut-off switching means to an open condition on the connection of one of said trunks to said line through said concentrator unit and for simultaneously releasing said line switching means.

2. A telephone concentrator system comprising a telephone central office, a plurality of trunks extending from said office, a remote substation line, a remote concentrator network for connecting said line to said trunks under control of said central office, combined remote sensory and cut-off means connected to said substation line for observing the service condition of said line, said sensory means including first, second and third switching means, means for connecting said first and second switching means to said substation line, means for connecting said third switching means to said concentrator network, means including said first and second switching means responsive to a service request condition for energizing said third switching means to deliver a supervisory signal to said concentrator network, means effective on the connection of said line to a selected one of said trunks through said concentrator network for opening said first, second and third switching means, and means responsive to the operation of said first and second switching means to said open condition for isolating said line from said means for energizing said third switching means.

3. An automatic telephone line concentrator system including a telephone central office, a plurality of trunks extending from said office, a remote substation line, a remote switching network for connecting said line to said trunks under control of said central office, a combined remote line and cut-off circuit connected to said line and responsive to supervisory conditions on said line, said line and cut-off circuit including first, second and third magnetic reed switches, a first and second winding surrounding said reed switches, means responsive to a service request condition on said line including said first and second reed switches for energizing said first winding, said third switch being operative to close in response to the energization of said first winding, means responsive to the closure of said third switch for delivering a supervisory indication indicative of a service request condition to said central office, and means effective on the connection of a selected idle trunk to said line by said switching network for energizing said second winding to open said first, second and third switches.

4. An automatic telephone line concentrator system in accordance with claim 3 including in addition means responsive to the disconnection of said selected idle trunk from said substation line to energize said second winding in the opposite direction thereby to reclose said first and second switches.

5. An automatic telephone line concentrator system in accordance with claim 4 including in addition permanent magnetic means disposed contiguous to said first and second switch means for maintaining said first and second switches in the closed condition indefinitely without continuous power drain.

6. A remote line and cut-off circuit for a line concentrator system comprising first, second and third magnetic reed switches, first and second windings encompassing all of said switches, means for energizing said first winding over a path including said first and second switches to close said third switch, and means for thereafter energizing said second winding in a first direction to open said first and second switches.

7. A remote line and cut-off circuit in accordance with claim 6 including in addition means for energizing said second winding in an opposite direction to reclose said first and second switches and to maintain said third switch in the open condition.

8. A remote line and cut-off circuit in accordance with claim 7 wherein said means for energizing said second winding in said opposite direction includes means for limiting the flux developed by said second winding to a magnitude lower than the flux developed when said second winding is energized in said first direction.

9. A remote line and cut-off circuit for a line concentrator system comprising first, second and third reed switch contacts, permanent magnetic means disposed contiguous to said first and second switches for maintaining said switches in the closed condition indefinitely, a first winding and a second winding encompassing all of said switches, means for energizing said first winding over a path including said first and second switches to operate said third switch, means for energizing said second winding in a first direction to actuate said first and second switches to an open condition, and means for thereafter actuating said second winding in a second direction to reclose said first and second switches and to maintain said third switch in the open condition.

10. A telephone line concentrator system including a telephone central office, a plurality of trunks extending from said office, a remote substation line, remote concentrator means for connecting said line to said trunks under control of said central office, remote line and cut-off means responsive to supervisory conditions on said line, said line and cut-off means including first, second and third magnetic reed switches, first and second windings encompassing said switches, means responsive to a service request condition on said line including said first and second reed switches and said first winding for closing said third reed switch, means connected to said third switch including voltage divider means for delivering a change of potential indication indicative of a service request condition to said central office, means effective on the connection of a selected idle trunk to said line for energizing said second winding in a first direction to reopen all of said switches, and means effective upon a disconnect condition at said substation and the maintenance of said connection between said line and said trunk for maintaining said first and second switches in the open condition.

11. An automatic telephone line concentrator system in accordance with claim 10 including in addition means effective upon the disconnection of said substation line from said trunk for energizing said second winding in an opposite direction to reclose said first and second switches and to maintain said third switch in the open condition.

12. A remote line and cut-off circuit for a line concentrator system including first and second magnetic reed cut-off contacts, magnetic reed line contacts, a first and second winding encompassing said reed contacts, permanent magnetic latching means for maintaining said first and second cut-off contacts in the closed position indefinitely without power drain, means including said cut-off contacts for energizing said first winding to actuate said line contacts, voltage divider impedance means responsive to the operation of said line contacts for generating a potential change indicative of a change in supervisory condition on said line, means for energizing said second winding in a first direction at a first current level to open said cut-off contacts and said line contacts, and means for energizing said second winding in an opposite direction at a second current level for reclosing said cut-off contacts and maintaining said line contacts in the open condition.

13. A remote line and cut-off circuit for a line concentrator system comprising first and second magnetic reed switches, first and second windings magnetically coupled to said switches, permanent magnetic means disposed contiguous to said first switch for maintaining said switch in the closed position without power drain, means for energizing said first winding over a path including said first reed switch to close said second reed switch, said means including means for delivering a pulse of current through said first winding in a direction to produce a flux in aid of the flux produced by said permanent magnetic means, and means for thereafter energizing said second winding in a direction to produce a flux in opposition to the flux produced by said first winding and said permanent magnetic means to open said first magnetic reed switch.

14. A remote line and cut-off circuit for a line concentrator system in accordance with claim 13 including in addition means for energizing said second winding in a direction to produce a flux in aid of said flux produced by said permanent magnetic means to reclose said first reed switch.

15. A remote line and cut-off circuit for a line concentrator system in accordance with claim 14 including in addition means for limiting said flux produced by said second winding on operation to reclose said first reed switch to a level less than said flux level produced by said second winding on operation to open said first reed switch, said second flux level being sufficient when added to said flux produced by said permanent magnetic means to close said first reed switch but insufficient to close said second reed switch.

16. An automatic telephone line concentrator system including a remote substation line, a central office, a plurality of trunks extending from said office, a concentrator network for connecting said line to said trunks, network control means for governing the operation of said network, a scanning circuit coupled to said central office and to said network control for detecting and indicating service conditions on said line, remote line and cut-off means connected to said line including first and second magnetic reed switches, first and second windings magnetically coupled to said first and second reed switches, means responsive to an off-hook condition on one of said lines for energizing said first winding over a path including said first magnetic reed switch to operate said second reed switch, means responsive to the operation of said second reed switch for delivering a service request signal to said scanning circuit and to said central office, means in said network control means effective on the operation of said scanning circuit for governing said concentrator network to extend a connection from said off-hook line to a selected idle trunk, and additional means in said network control means for momentarily energizing said second winding with current in a first direction to open said first magnetic reed switch thereby de-energizing said first winding and releasing said second magnetic reed switch.

17. An automatic telephone line concentrator system in accordance with claim 16 including in addition means in said network control means for governing said concentrator network to disestablish said connection between said line and said selected trunk and for delivering a pulse of current in an opposite direction through said second winding, said pulse of current being of a lesser magnitude than said current of said first direction and adapted to produce a flux sufficient to reclose said first reed switch but insufficient to reclose said second reed switch.

References Cited in the file of this patent

UNITED STATES PATENTS

| | | |
|---|---|---|
| 2,187,115 | Elwood et al. | Jan. 16, 1940 |
| 3,022,382 | Ewin | Feb. 20, 1962 |
| 3,030,451 | Jacobson | Apr. 17, 1962 |